United States Patent
von Benten et al.

(10) Patent No.: US 9,562,143 B2
(45) Date of Patent: Feb. 7, 2017

(54) LASER-TRANSPARENT POLYESTERS WITH CARBOXYLIC SALTS

(75) Inventors: Rebekka von Benten, Ludwigshafen (DE); Peter Eibeck, Speyer (DE)

(73) Assignee: BASF SE, Ludwigshafen (DE)

( * ) Notice: Subject to any disclaimer, the term of this patent is extended or adjusted under 35 U.S.C. 154(b) by 824 days.

(21) Appl. No.: 13/408,397

(22) Filed: Feb. 29, 2012

(65) Prior Publication Data
US 2012/0231285 A1    Sep. 13, 2012

Related U.S. Application Data

(60) Provisional application No. 61/450,174, filed on Mar. 8, 2011.

(51) Int. Cl.
| | |
|---|---|
| *C08L 67/02* | (2006.01) |
| *C08K 5/098* | (2006.01) |
| *B29K 67/00* | (2006.01) |
| *C08L 33/02* | (2006.01) |
| *B29C 65/16* | (2006.01) |
| *B29C 65/00* | (2006.01) |

(52) U.S. Cl.
CPC ............ *C08K 5/098* (2013.01); *B29C 65/167* (2013.01); *B29C 65/1609* (2013.01); *B29C 65/1616* (2013.01); *B29C 65/1635* (2013.01); *B29C 65/1658* (2013.01); *B29C 65/1661* (2013.01); *B29C 65/1674* (2013.01); *B29C 65/1696* (2013.01); *B29C 66/71* (2013.01); *B29C 66/7392* (2013.01); *B29K 2067/00* (2013.01); *C08L 33/02* (2013.01); *Y10T 428/31786* (2015.04)

(58) Field of Classification Search
CPC ...................................... C08L 67/02
USPC ...................................... 524/284
See application file for complete search history.

(56) References Cited

U.S. PATENT DOCUMENTS

| | | | | |
|---|---|---|---|---|
| 5,496,887 A | * | 3/1996 | Braune | .................. C08G 63/83 524/765 |
| 5,552,463 A | * | 9/1996 | Akkapeddi | ............. C08L 67/02 524/102 |
| 6,521,326 B1 | * | 2/2003 | Fischer | ................... B32B 27/04 156/272.2 |
| 2008/0153957 A1 | | 6/2008 | Miyamoto | |
| 2011/0288220 A1 | | 11/2011 | Benten et al. | |
| 2011/0306707 A1 | | 12/2011 | Benten et al. | |
| 2012/0183778 A1 | * | 7/2012 | Farrell et al. | ................. 428/412 |
| 2012/0189793 A1 | * | 7/2012 | Tsuneizumi | ........... C08K 5/435 428/35.7 |

FOREIGN PATENT DOCUMENTS

WO    WO-2004020178 A1    3/2004

OTHER PUBLICATIONS

International Search Report for PCT/EP2012/053769, dated Jun. 22, 2012.
U.S. Appl. No. 61/416,756, filed Nov. 24, 2010, Benten et al.
U.S. Appl. No. 13/107,219, filed May 13, 2011, Benten et al.
U.S. Appl. No. 13/157,965, filed Jun. 10, 2011, Benten et al.
U.S. Appl. No. 13/408,352, filed Feb. 29, 2012, Von Benten et al.
U.S. Appl. No. 13/408,380, filed Feb. 29, 2012, Von Benten et al.
Kunststoffe, 87, 1997, 11, 1632-1640.
Kunststoffe, 87, 1997, 3, 348-350.
Kunststoffe, 88, 1998, 2, 210-212.
Plastverarbeiter, 50, 1999, 4, 18-19.
Plastverarbeiter, 46, 1995, 9, 42-46.
Handbuch Kunststoff-Verbindungstechnik, G. W. Ehrenstein, ISBN 3-446-22668-0, p. 232-256, 2004.
DVS Richtlinie 2243, Laserstrahlschweißen thermoplastischer Kunststoff.
U.S. Appl. No. 61/449,733, no date, Benten et al.
U.S. Appl. No. 61/416,756, no date, Benten et al.
U.S. Appl. No. 61/450,174, no date, Benten et al.
U.S. Appl. No. 61/450,145, no date, Benten et al.

* cited by examiner

*Primary Examiner* — Michael Pepitone
(74) *Attorney, Agent, or Firm* — Drinker Biddle & Reath LLP

(57) ABSTRACT

Use of thermoplastic molding compositions comprising, as essential components,
A) from 29 to 99.8% by weight of a polyester,
B) from 0.2 to 2.0% by weight of alkali metal salts of aliphatic carboxylic acids or a mixture of these, based on 100% by weight of A) and B), and also moreover
C) from 0 to 70% by weight of further additives, where the total of the % by weight values for A) to C) is 100%, for producing laser-transparent moldings of any type.

19 Claims, No Drawings

LASER-TRANSPARENT POLYESTERS WITH CARBOXYLIC SALTS

CROSS-REFERENCE TO RELATED APPLICATIONS

This application claims benefit (under 35 USC 119(e)) of U.S. Provisional Application 61/450,174, filed Mar. 8, 2011, which is incorporated by reference.

BACKGROUND OF THE INVENTION

The invention relates to the use of thermoplastic molding compositions comprising, as essential components,
  A) from 29 to 99.8% by weight of a polyester,
  B) from 0.2 to 2.0% by weight of alkali metal salts of aliphatic carboxylic acids or a mixture of these, based on 100% by weight of A) and B), and also moreover
  C) from 0 to 70% by weight of further additives,
  where the total of the % by weight values for A) to C) is 100%,
for producing laser-transparent moldings of any type.

The invention further relates to the use of the laser-transparent moldings for producing moldings by means of laser transmission welding processes, the processes for producing moldings of this type, and also to the use of these in various application sectors.

Components B) of this type are by way of example described in U.S. Pat. No. 3,761,450 and U.S. Pat. No. 4,558,085 as nucleating agents for compounded PET materials. The optical properties of the compounded materials were not investigated.

There are various processes (Kunststoffe 87, (1997), 11, 1632-1640) for welding plastics moldings. In the case of the widely used processes of heated-tool welding and vibration welding (e.g. of motor-vehicle inlet manifolds), precondition for a stable weld is adequate softening of the adherends in the contact zone prior to the actual step that produces the join.

Laser transmission welding is a method providing an alternative to vibration welding and heated-tool welding, and has seen a constant increase in its use in recent times, in particular with use of diode lasers.

The technical literature describes the fundamental principles of laser transmission welding (Kunststoffe 87, (1997) 3, 348-350; Kunststoffe 88, (1998), 2, 210-212; Kunststoffe 87 (1997) 11, 1632-1640; Plastverarbeiter 50 (1999) 4, 18-19; Plastverarbeiter 46 (1995) 9, 42-46).

Precondition for the use of laser transmission welding is that the radiation emitted from the laser first passes through a molding which has adequate transparency for laser light of the wavelength used, and which in this patent application is hereinafter termed laser-transparent molding, and is then absorbed, in a thin layer, by a second molding which is in contact with the laser-transparent molding and which hereinafter is termed laser-absorbent molding. Within the thin layer that absorbs the laser light, the energy of the laser is converted into heat, which leads to melting within the contact zone and finally to bonding of the laser-transparent and of the laser-absorbent molding via a weld.

Laser transmission welding usually uses lasers in the wavelength range from 600 to 1200 nm. In the wavelength range of the lasers used for thermoplastics welding, it is usual to use Nd:YAG lasers (1064 nm) or high-power diode lasers (from 800 to 1000 nm). When the terms laser-transparent and laser-absorbent are used hereinafter, they always refer to the abovementioned wavelength range.

A requirement for the laser-transparent molding, in contrast to the laser-absorbent molding, is high laser transparency in the preferred wavelength range, so that the laser beam can penetrate as far as the weld area, with the necessary energy. By way of example, transmittance for IR laser light is measured by using a spectrophotometer and an integrating photometer sphere. This measurement system also detects the diffuse fraction of the transmitted radiation. The measurement is carried out not merely at one wavelength but within a spectral range which comprises all of the laser wavelengths currently used for the welding procedure.

Users presently have access to a number of laser-welding-process variants based on the transmission principle. By way of example, contour welding is a sequential welding process in which either the laser beam is conducted along a freely programmable weld contour or the component is moved relatively to the immovable laser. In the simultaneous welding process, the linear radiation emitted from individual high-power diodes is arranged along the weld contour to be welded. The melting and welding of the entire contour therefore takes place simultaneously. The quasi-simultaneous welding process is a combination of contour welding and simultaneous welding. Galvanometric mirrors (scanners) are used to conduct the laser beam at a very high velocity of 10 m/s or more along the contour of the weld. The high traverse rate provides progressive heating and melting of the region of the join. In comparison with the simultaneous welding process, there is high flexibility for alterations in the contour of the weld. Mask welding is a process in which a linear laser beam is moved transversely across the adherends. A mask is used for controlled screening of the radiation, and this impacts the area to be joined only where welding is intended. The process can produce very precisely positioned welds. These processes are known to the person skilled in the art and are described by way of example in "Handbuch Kunststoff-Verbindungstechnik" [Handbook of plastics bonding technology](G. W. Ehrenstein, Hanser, ISBN 3-446-22668-0) and/or DVS-Richtlinie 2243 "Laserstrahlschweißen thermoplastischer Kunststoffe" [German Welding Society Guideline 2243 "Laser welding of thermoplastics"].

Irrespective of the process variant used, the laser welding process is highly dependent on the properties of the materials of the two adherends. The degree of laser transparency (LT) of the transparent component has a direct effect on the speed of the process, through the amount of energy that can be introduced per unit of time. The inherent microstructure, mostly in the form of spherulites, of semicrystalline thermoplastics generally gives them relatively low laser transparency. These spherulites scatter the incident laser light to a greater extent than the internal structure of a purely amorphous thermoplastic: back-scattering leads to a reduced total amount of transmitted energy, and diffuse (lateral) scattering often leads to broadening of the laser beam and therefore to impaired weld precision. These phenomena are particularly evident in polybutylene terephthalate (PBT), which in comparison with other thermoplastics that crystallize well, such as PA, exhibits particularly low laser transparency and a high level of beam expansion. PBT therefore continues to be comparatively little used as material for laser-welded components, although other aspects of its property profile (e.g. good dimensional stability and low water absorption) make it very attractive for applications of this type. Although semicrystalline morphology is generally unhelpful for high laser transparency, it provides advantages in terms of other properties. By way of example, semicrystalline materials continue to have mechanical strength above the glass transition point and generally have better chemicals resistance than amorphous materials. Materials that crystallize rapidly also provide processing advantages, in particular quick demoldability and therefore short cycle times. It is therefore desirable to combine semicrystallinity with rapid crystallization and high laser transparency.

There are various known approaches to laser-transparency improvement in polyesters, in particular PBT. In principle, these can be divided into blends/mixtures and refractive-index matching.

The approach using blends/mixtures is based on "dilution" of the low-laser-transparency PBT by using a high-laser-transparency partner in the blend/mixture. Examples of this are found in the following specifications: JP2004/315805A1 (PBT+PC/PET/SA+filler+elastomer), DE-A1-10330722 (generalized blend of a semicrystalline thermoplastic with an amorphous thermoplastic in order to increase LT; spec. PBT+PET/PC+glass fiber), JP2008/106217A (PBT+copolymer with 1,4-cyclohexanedimethanol; LT of 16% increased to 28%), A disadvantage here is that the resultant polymer blends inevitably have properties markedly different from those of products based predominantly on PBT as matrix.

The refractive-index matching approach is based on the different refractive indices of amorphous and crystalline PBT, and also of the fillers. By way of example, comonomers have been used here: JP2008/163167 (copolymer of PBT and siloxane), JP2007/186584 (PBT+bisphenol A diglycidyl ether) and JP2005/133087 (PBT+PC+elastomer+high-refractive-index silicone oil) may be mentioned as examples. Although this leads to an increase in laser transparency, this is achieved with loss of mechanical properties. The refractive-index difference between filler and matrix can also be reduced, see JP2009/019134 (epoxy resin coated onto glass fibers in order to provide matching at the optical interface between fiber and matrix), or JP2007/169358 (PBT with high-refractive-index glass fiber). Starting materials of this type are, however, disadvantageous because of their high costs and/or the additional stages that they require within the production process.

The effects achieved in relation to laser-transparency increase are also overall relatively minor and therefore not entirely satisfactory.

A SUMMARY OF THE INVENTION

The invention relates to a process for producing laser-transparent moldings which comprises utilizing a thermoplastic molding compositions comprising, as essential components,
A) from 29 to 99.8% by weight of a polyester,
B) from 0.2 to 2.0% by weight of alkali metal salts of aliphatic carboxylic acids or a mixture of these, based on 100% by weight of A) and B), and also moreover
C) from 0 to 70% by weight of further additives, where the total of the % by weight values for A) to C) does not exceed 100%.

A DETAILED DESCRIPTION OF THE INVENTION

The object of the present invention was therefore to improve the laser transparency of polyesters. The molding compositions defined in the introduction were accordingly found. The dependent claims give preferred embodiments.

The molding compositions of the invention comprise, as component A), from 29 to 99.8% by weight, preferably from 98.5 to 99.7% by weight, and in particular from 99 to 99.6% by weight, of at least one thermoplastic polymer, based on components A) and B).

At least one of the polyesters in component A) is a semicrystalline polyester. Preference is given to components A) which comprise at least 50% by weight of semicrystalline polyesters. Said proportion is particularly preferably 70% by weight (based in each case on 100% by weight of A)).

Based on 100% of the molding compositions made of A) to C) (i.e. inclusive of C)), these comprise
from 30 to 100% by weight of A)+B), preferably from 50 to 100% by weight, and
from 0 to 70% by weight of C), preferably from 0 to 50% by weight.

An essential constituent of the above relative magnitudes is that the proportion of component B) is always based on the polyester, since said ratio is intended to be within the abovementioned limits. The additives C) can affect laser transparency. This effect is in essence dependent on the scattering properties and absorption properties of the additives. The optical properties of the compounded material are in essence a summation of the optical properties of the matrix of the invention (components A+B) and of those of the additives (components C).

Polyesters A) used are generally based on aromatic dicarboxylic acids and on an aliphatic or aromatic dihydroxy compound.

A first group of preferred polyesters is that of polyalkylene terephthalates having in particular from 2 to 10 carbon atoms in the alcohol moiety.

Polyalkylene terephthalates of this type are known per se and are described in the literature. Their main chain comprises an aromatic ring which derives from the aromatic dicarboxylic acid. There may also be substitution in the aromatic ring, e.g. by halogen, such as chlorine or bromine, or by $C_1$-$C_4$-alkyl groups, such as methyl, ethyl, iso- or n-propyl, or n-, iso- or tert-butyl groups.

These polyalkylene terephthalates may be produced by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid or mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The intrinsic viscosity of the polyesters (A) is generally in the range from 50 to 220, preferably from 80 to 160 (measured in 0.5% strength by weight solution in a phenol/o-dichlorobenzene mixture (in a ratio by weight of 1:1 at 25° C.) to ISO 1628).

Particular preference is given to polyesters whose carboxy end group content is from 0 to 100 meq/kg of polyester, preferably from 10 to 50 meq/kg of polyester and in particular from 15 to 40 meq/kg of polyester. Polyesters of this type may be produced, for example, by the process of DE-A 44 01 055. The carboxy end group content is usually determined by titration methods (e.g. potentiometry).

Particularly preferred molding compositions comprise, as component A), a mixture of polyesters, at least one being PBT. An example of the proportion of the polyethylene terephthalate in the mixture is preferably up to 50% by weight, in particular from 10 to 35% by weight, based on 100% by weight of A).

It is also advantageous to use PET recyclates (also termed scrap PET) optionally in a mixture with polyalkylene terephthalates, such as PBT.

Recyclates are generally:
1) those known as post-industrial recyclates: these are production wastes during polycondensation or during processing, e.g. sprues from injection molding, start-up material from injection molding or extrusion, or edge trims from extruded sheets or films.
2) post-consumer recyclates: these are plastics items which are collected and treated after utilization by the end consumer. Blow-molded PET bottles for mineral water, soft drinks and juices are easily the predominant items in terms of quantity.

Both types of recyclate may be used either as regrind or in the form of pellets. In the latter case, the crude recycled materials are isolated and purified and then melted and pelletized using an extruder. This usually facilitates handling and free-flowing properties, and metering for further steps in processing.

The recycled materials used may either be pelletized or in the form of regrind. The edge length should not be more than 10 mm and should preferably be less than 8 mm.

Because polyesters undergo hydrolytic cleavage during processing (due to traces of moisture) it is advisable to predry the recycled material. Residual moisture content after drying is preferably <0.2%, in particular <0.05%.

Another class to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

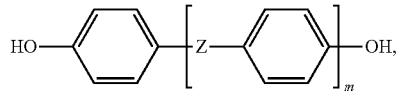

in which Z is an alkylene or cycloalkylene group having up to 8 carbon atoms, an arylene group having up to 12 carbon atoms, a carbonyl group, a sulfonyl group, an oxygen atom or sulfur atom, or a chemical bond, and in which m has the value from 0 to 2. The phenylene groups in the compounds may also have substitution by $C_1$-$C_6$-alkyl groups or alkoxy groups, and fluorine, chlorine, or bromine.

Examples of parent compounds for these compounds are
dihydroxybiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl)sulfone, di(hydroxybenzoyl)benzene,
resorcinol, and hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone, and
2,2-di(3',5'-dimethyl-4'-hydroxyphenyl)propane
or a mixture of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

In the invention, the term polyester includes halogen-free polycarbonates. Examples of suitable halogen-free polycarbonates are those based on biphenols of the general formula

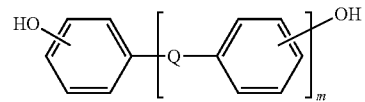

in which Q is a single bond, a $C_1$- to $C_8$-alkylene group, a $C_2$- to $C_3$-alkylidene group, a $C_3$- to $C_6$-cycloalkylidene group, a $C_6$- to $C_{12}$-arylene group, or else —O—, —S—, or —SO$_2$—, and m is a whole number from 0 to 2.

The phenylene radicals of the biphenols can also have substituents, examples being $C_1$- to $C_8$-alkyl or $C_1$- to $C_6$-alkoxy.

Examples of preferred biphenols of this formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight average) of from 10 000 to 200 000 g/mol, preferably from 20 000 to 80 000 g/mol.

The biphenols of the general formula are known per se or can be produced by known processes.

The polycarbonates may, for example, be produced by reacting the biphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1,3-tetramethylbutyl)phenol, as in DE-A 28 42 005, or monoalkylphenols, or dialkylphenols with a total of from 8 to 20 carbon atoms in the alkyl substituents, as in DE-A 35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and optionally from halogen-free branching agents, where the content of subordinate amounts at the ppm level of hydrolyzable chlorine, resulting, for example, from the production of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where phosgene has been replaced, during the preparation, by aromatic dicarboxylic acid units, such as isophthalic acid and/or terephthalic acid units. For further details reference may be made at this point to EP-A 711 810.

Other suitable copolycarbonates with cycloalkyl radicals as monomer units have been described in EP-A 365 916.

It is also possible to replace bisphenol A with bisphenol TMC. Polycarbonates of this type are commercially available from Bayer with the trademark APEC HT®.

The molding compositions of the invention comprise, as component B), from 0.2 to 2.0% by weight, preferably from 0.3 to 1.5% by weight, and in particular from 0.4 to 1% by weight, based on 100% by weight of A)+B), of alkali metal salts of aliphatic carboxylic acids or a mixture of these.

The carboxy end groups of the polyesters A) generally react with the salt compounds B), whereupon the metal cation of the carbonate is transferred from the carbonate to the end group. The nucleating action of component B) is detectable even at extremely low concentrations. It is surprising that laser transparency falls with very low concentrations of component B) and that a rise in laser transparency is not achieved until higher concentrations are reached.

The amount of component B) comprised in preferred components A) (based on 100% of A) and B)) is from 15 to 200 mmol/kg of polyester, in particular from 20 to 100 mmol/kg of polyester, and in particular from 25 to 75 mmol/kg of polyester, where these concentration data are based on the respective anion of the acid. Because the nucleating carboxylic acid salts have different molecular weights and equivalent weights, the specification has been expressed in terms of the above data in mmol/kg of polyester.

Preferred alkali metals are potassium and/or sodium.

Mention may be made of the following varied list of aliphatic carboxylic acids of the invention:

Preference is given to saturated or unsaturated carboxylic acids having from 1 to 40, preferably from 1 to 22, carbon atoms, which may bear heteroatoms, preferably halogens. Preferred carboxylic acids comprise no heteroatoms.

The carboxylic acids can be monobasic or dibasic. Examples that may be mentioned are pelargonic acid, margaric acid, dodecanedioic acid, behenic acid, and montanic acid (a mixture of fatty acids having from 30 to 40 carbon atoms), and also

| | |
|---|---|
| Formic acid | HCOOH |
| Acetic acid | $CH_3COOH$ |
| Propionic acid | $CH_3CH_2COOH$ |
| Butyric acid | $CH_3(CH_2)_2COOH$ |
| Valeric acid | $CH_3(CH_2)_3COOH$ |
| Caproic acid | $CH_3(CH_2)_4COOH$ |
| Caprylic acid | $CH_3(CH_2)_6COOH$ |
| Capric acid | $CH_3(CH_2)_8COOH$ |
| Lauric acid | $CH_3(CH_2)_{10}COOH$ |
| Myristic acid | $CH_3(CH_2)_{12}COOH$ |
| Palmitic acid | $CH_3(CH_2)_{14}COOH$ |
| Stearic acid | $CH_3(CH_2)_{16}COOH$ |
| Oleic acid | cis-9-octadecadienic acid |
| Linoleic acid | cis-cis-9,12-octadecandienoic acid |
| Linolenic acid | cis,cis,cis-9,12,15-octadecadienoic acid |
| Cyclohexanecarboxylic acid | cyclo-$C_6H_{11}COOH$ |
| α-Methylbutyric acid | $CH_3-CH_2-CH(CH_3)-COOH$ |
| α,β-Dimethylvaleric acid | $CH_3-CH_2-CH(CH_3)-CH(CH_3)-COOH$ |
| α-Hydroxypropionic acid | $CH_3-CH(OH)-COOH$ |
| Pentanoic acid | $CH_3-CH_2-CH_2-CH_2-COOH$ | and also di- or polybasic acids such as

| | |
|---|---|
| Oxalic acid | HOOC—COOH |
| Malonic acid | HOOC—$CH_2$—COOH |
| Succinic acid | HOOC—$(CH_2)_2$—COOH |
| Glutaric acid | HOOC—$(CH_2)_3$—COOH |
| Adipic acid | HOOC—$(CH_2)_4$—COOH | and also unsaturated carboxylic acids such as

| | |
|---|---|
| Acrylic acid | CH=CHCOOH |
| Crotonic acid | trans-$CH_3CH$=CHCOOH |
| Isocrotonic acid | cis-$CH_3CH$=CHCOOH |
| Methacrylic acid | $CH_2$=C($CH_3$)COOH |
| Sorbic acid | $CH_3CH$=CHCH=CHCOOH |
| Cinnamic acid | trans-$C_6H_5CH$=CHCOOH |
| Maleic acid | cis-HOOCCH=CHCOOH |
| Fumaric acid | trans-HOOCCH=CHCOOH |
| 2-Butenoic acid | $CH_2$—CH=CH—COOH |

Processes for producing these acids are known to the person skilled in the art.

Other preferred components B) are salts, in particular sodium salts, of polyacrylic acids of the formula

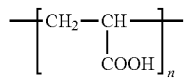

where n=from 10 to 300, preferably from 100 to 200 where these are generally obtainable via free-radical polymerization of acrylic acid.

Preferred compounds B) are sodium formate, sodium acetate, sodium stearate, disodium adipate, and the sodium salt of polyacrylic acid, or a mixture of these.

The molding compositions of the invention can comprise, as component C), from 0 to 70% by weight, in particular up to 50% by weight, of further additives and processing aids, where these differ from B) and/or A), based on 100% by weight of A), B), and C).

Examples of conventional additives C) are amounts of up to 40% by weight, preferably up to 15% by weight, of elastomeric polymers (often also termed impact modifiers, elastomers, or rubbers).

These very generally involve copolymers, which are preferably composed of at least two of the following monomers: ethylene, propylene, butadiene, isobutene, isoprene, chloroprene, vinyl acetate, styrene, acrylonitrile, and acrylates and, respectively, methacrylates having from 1 to 18 carbon atoms in the alcohol component.

Polymers of this type are described, for example, in Houben-Weyl, Methoden der organischen Chemie, Vol. 14/1 (Georg Thieme Verlag, Stuttgart, Germany, 1961), pages 392-406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or a mixture of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl(meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formula I, II, III or IV

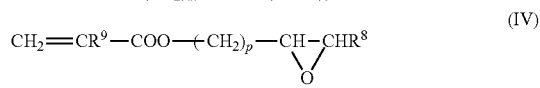

where $R^1$ to $R^9$ are hydrogen or alkyl groups having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising acid anhydride groups, the remaining amount being (meth)acrylates.

Particular preference is given to copolymers composed of from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid, and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may also be used are vinyl esters and vinyl ethers.

The ethylene copolymers described above may be produced by processes known per se, preferably by random copolymerization at high pressure and elevated temperature. Appropriate processes are well known.

Other preferred elastomers are emulsion polymers whose production is described, for example, by Blackley in the monograph "Emulsion polymerization". The emulsifiers and catalysts which can be used are known per se.

In principle it is possible to use homogeneously structured elastomers or those with a shell structure. The shell-type structure is determined by the sequence of addition of the individual monomers. The morphology of the polymers is also affected by this sequence of addition.

Monomers which may be mentioned here, merely as examples, for the production of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally produced by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

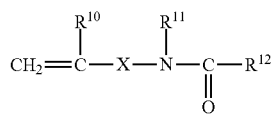

where the definitions of the substituents can be as follows:
$R^{10}$ is hydrogen or a $C_1$-C4-alkyl group,
$R^{11}$ is hydrogen or a $C_1$-C8-alkyl group or an aryl group, especially phenyl,
$R^{12}$ is hydrogen, a $C_1$-$C_{10}$-alkyl or $C_6$-$C_{12}$-aryl group or —$OR^{13}$,
$R^{13}$ is a $C_1$-$C_8$-alkyl or $C_6$-$C_{12}$-aryl group, each optionally having substitution by O- or N-containing groups,
X is a chemical bond or a $C_1$-$C_{10}$-alkylene or $C_6$-$C_{12}$-arylene group or
Y is O—Z or NH—Z, and

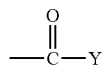

Z is a $C_1$-$C_{10}$-alkylene group or a $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope made of monomers as described under I and II for the core, second envelope as described under I or IV for the envelope |

These graft polymers, in particular ABS polymers and/or ASA polymers, are preferably used in amounts of up to 40% by weight for impact-modification of PBT optionally in a mixture with up to 40% by weight of polyethylene terephthalate. Appropriate blend products are obtainable with trademark Ultradur®S (previously Ultrablend®S from BASF AG).

Instead of graft polymers whose structure has more than one shell, it is also possible to use homogeneous, i.e. single-shell, elastomers made from 1,3-butadiene, isoprene and n-butyl acrylate or from copolymers of these. These products, too, may be produced by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described can also be produced by other conventional processes, e.g. via suspension polymerization.

Preference is likewise given to silicone rubbers as described in DE-A 37 25 576, EP-A 235 690, DE-A 38 00 603, and EP-A 319 290.

It is, of course, also possible to use a mixture of the types of rubber listed above.

Fibrous or particulate fillers C) that may be mentioned are glass fibers, glass beads, amorphous silica, asbestos, calcium silicate, calcium metasilicate, magnesium carbonate, kaolin, chalk, powdered quartz, mica, barium sulfate, and feldspar. The amounts used of fibrous fillers C) are up to 60% by weight, in particular up to 35% by weight, and the amounts used of particulate fillers are up to 30% by weight, in particular up to 10% by weight.

Preferred fibrous fillers that may be mentioned are aramid fibers and potassium titanate fibers, and particular preference is given here to glass fibers in the form of E glass. These can be used in the form of rovings or of chopped glass in the forms commercially obtainable.

The amounts used of fillers that have high laser absorbency, for example carbon fibers, carbon black, graphite, graphene, or carbon nanotubes, are preferably below 1% by weight, particularly preferably below 0.05% by weight.

The fibrous fillers can have been surface-pretreated with a silane compound in order to improve compatibility with the thermoplastic.

Suitable silane compounds are those of the general formula

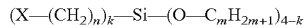

where the definitions of the substituents are as follows:
X NH$_2$—,

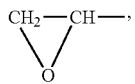

HO—,
n is an integer from 2 to 10, preferably from 3 to 4
m is an integer from 1 to 5, preferably from 1 to 2
k is an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used for surface coating of the silane compounds are from 0.05 to 5% by weight, preferably from 0.1 to 1.5% by weight, and in particular 0.2 to 0.5% by weight (based on C).

Acicular mineral fillers are also suitable.

For the purposes of the invention, acicular mineral fillers are a mineral filler with pronounced acicular character. An example that may be mentioned is acicular wollastonite. The L/D (length to diameter) ratio of the mineral is preferably from 8:1 to 35:1, with preference from 8:1 to 11:1. The mineral filler can optionally have been pretreated with the abovementioned silane compounds; however, the pretreatment is not essential.

The thermoplastic molding compositions of the invention can comprise, as component C), conventional processing aids, such as stabilizers, oxidation retarders, agents to counteract decomposition by heat and decomposition by ultraviolet light, lubricants and mold-release agents, colorants, such as dyes and pigments, plasticizers, etc.

Examples that may be mentioned of oxidation retarders and heat stabilizers are sterically hindered phenols and/or phosphites, hydroquinones, aromatic secondary amines, such as diphenylamines, various substituted members of said groups, and mixtures of these in concentrations which are up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Colorants that can be added comprise inorganic and organic pigments, and also dyes, such as nigrosin, and anthraquinones. Particularly suitable colorants are mentioned by way of example in EP 1722984 B1, EP 1353986 B1, or DE 10054859 A1.

Preference is further given to esters or amides of saturated or unsaturated aliphatic carboxylic acids having from 10 to 40, preferably from 16 to 22, carbon atoms with saturated aliphatic alcohols or amines which comprise from 2 to 40, preferably from 2 to 6, carbon atoms.

The carboxylic acids can be monobasic or dibasic. Examples that may be mentioned are pelargonic acid, palmitic acid, lauric acid, margaric acid, dodecanedioic acid, behenic acid, and with particular preference stearic acid, and capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given here to glycerol and pentaerythritol.

The aliphatic amines can be mono- to trifunctional. Examples of these are stearylamine, ethylenediamine, propylenediamine, hexamethylenediamine, and di(6-aminohexyl)amine, particular preference being given here to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or esters combined with amides, in any desired mixing ratio.

The amounts usually used of further lubricants and mold-release agents are usually up to 1% by weight. These are preferably long-chain fatty acids (e.g. stearic acid or behenic acid) or else low-molecular-weight polyethylene waxes or low-molecular-weight polypropylene waxes.

Examples that may be mentioned of plasticizers are dioctyl phthalate, dibenzyl phthalate, butyl benzyl phthalate, hydrocarbon oils, and N-(n-butyl)benzenesulfonamide.

The molding compositions of the invention can also comprise from 0 to 2% by weight of fluorine-containing ethylene polymers. These are polymers of ethylene having fluorine content of from 55 to 76% by weight, preferably from 70 to 76% by weight.

Examples here are polytetrafluoroethylene (PTFE), tetrafluoroethylene-hexafluoropropylene copolymers, or tetrafluoroethylene copolymers having relatively small proportions (generally up to 50% by weight) of copolymerizable ethylenically unsaturated monomers. These are described by way of example by Schildknecht in "Vinyl and Related Polymers", Wiley-Verlag, 1952, pages 484 to 494, and by Wall in "Fluorpolymers" (Wiley Interscience, 1972).

The form in which these fluorine-containing ethylene polymers are present in the molding compositions is that of a homogeneous dispersion, and their $d_{50}$ (number-average) particle size is preferably in the range from 0.05 to 10 µm, in particular from 0.1 to 5 µm. These small particle sizes can particularly preferably be achieved via use of aqueous dispersions of fluorine-containing ethylene polymers and incorporation of these into a polyester melt.

The thermoplastic molding compositions of the invention can be produced by processes known per se, by mixing the starting components in conventional mixing apparatuses, such as screw extruders, Brabender mixers, or Banbury mixers, and then extruding the same. The extrudate can be cooled and comminuted after the extrusion. It is also possible to premix individual components (e.g. applying component B) to the pellets, for example in a drum), then adding the remaining starting materials individually and/or after they have been likewise mixed. The mixing temperatures are generally from 230 to 290° C. Component B) can also preferably be added to the extruder inlet by the hot-feed or direct method.

In another preferred method of operation, components B) and also optionally C) can be mixed with a polyester prepolymer, and compounded and pelletized. The resultant pellets are then solid-phase condensed under inert gas continuously or batchwise at a temperature below the melting point of component A) until the desired viscosity has been reached.

The molding compositions that can be used by the invention are suitable for producing laser-transparent moldings. The laser transparency of these is preferably at least 33%, in particular at least 40% (measured at 1064 nm on moldings of thickness 2 mm, by the test method described in the examples).

The invention uses laser-transparent moldings of this type to produce moldings by means of laser transmission welding processes.

The laser-absorbent molding used can generally comprise moldings made of any of the materials that are laser-absorbent. By way of example, these can be composite substances, thermosets, or preferred moldings made of specific thermoplastic molding compositions. Suitable thermoplastic molding compositions are molding compositions which have adequate laser absorption in the wavelength range used. By way of example, suitable thermoplastic molding compositions can preferably be thermoplastics which are laser-absorbent through addition of inorganic pigments, such as carbon black, and/or through addition of organic pigments or of other additives. Examples of suitable organic pigments for achieving laser absorption are preferably IR-absorbent organic compounds such as those described by way of example in DE 199 16 104 A1.

The invention further provides moldings and/or molding combinations to which moldings of the invention were bonded by laser transmission welding.

Moldings of the invention have excellent suitability for application in a long-lasting and stable manner to laser-absorbent moldings by the laser transmission welding process. They therefore have particular suitability for materials for covers, housings, add-on components, and sensors, for example for applications in the motor-vehicle, electronics, telecommunications, information-technology, computer, household, sports, medical, or entertainment sector.

Examples

Component A/1

Polybutylene terephthalate with an intrinsic viscosity of 130 ml/g and with carboxy end group content of 34 meq/kg (Ultradur® B 4500 from BASF SE) (IV measured in 0.5% strength by weight solution of phenol/o-dichlorobenzene, 1:1 mixture at 25° C., to ISO 1628).

Component B

| | |
|---|---|
| B1 | Sodium formate |
| | Molar mass: 68 g/mol |
| B2 | Sodium acetate |
| | Molar mass: 82 g/mol |
| B3 | Sodium stearate |
| | Molar mass: 306.5 g/mol |
| B4 | Disodium adipate |
| | Equivalent molar mass: 95 g/mol |
| B5 | Na salt of polyacrylic acid |
| | Mn about 15000 g/mol |
| | pH of a 10% aqueous solution: 7 |
| | Molar mass (repeat unit): 94 g/mol |

The molding compositions were produced in a ZSK25 with a flat temperature profile at from 250 to 260° C. and with pelletization.

Laser Transparency Measurement

A thermoelectric power measurement was used to determine laser transmittance at wavelength 1064 nm. The measurement geometry was set up as follows: a beam divider (SQ2 nonpolarizing beam divider from Laseroptik GmbH) was used to divide a reference beam of power 1 watt at an angle of 90° from a laser beam (diode-pumped Nd-YAG laser of wavelength 1064 nm, FOBA DP50) with total power of 2 watts. The reference beam impacted the reference sensor. That portion of the original beam that passed through the beam divider provided the measurement beam likewise with power of 1 watt. This beam was focused to focal diameter 0.18 µm via a mode diaphragm (5.0) behind the beam divider. The laser transparency (LT) measurement sensor was positioned 80 mm below the focus. The test sheet was positioned 2 mm above the LT measurement sensor. The dimensions of the injection-molded test sheets used were $60*60*2$ mm$^3$ and they had edge gating. The measurement was made in the middle of the sheet (point of intersection of the two diagonals). The settings used for the injection-molding parameters were as follows:

|  | Melt temp. [° C.] | Mold temp. [° C.] | Injection rate [cm³/s] | Hold pressure [bar] |
|---|---|---|---|---|
| Unreinforced materials | 260 | 60 | 48 | 600 |
| Reinforced materials | 260 | 80 | 48 | 600 |

The total measurement time was 30 s, and the result of the measurement is determined within the final 5 s. The signals from the reference sensor and measurement sensor were recorded simultaneously. The measurement process begins with insertion of the specimen. Transmittance, and therefore laser transparency, was obtained from the following formula:

LT=(signal(measurement sensor)/signal(reference sensor))×100%.

This measurement method excluded variations in the laser system and subjective read-out errors.

The average LT value for a sheet was calculated from at least five measurements. For each material, the average value was calculated on 10 sheets. The average values from the measurements on the individual sheets were used to calculate the average value, and also the standard deviation, for the material.

The following further measurements were made:
Calorimetric studies using DSC to ISO 11357, heating and cooling rate 20 K/min. The crystallization peak temperature $T_{PC}$ was determined in the first cooling procedure.

The tensile test was carried out to ISO 527.

TABLE 1

| Component | Amount of nucl. [% by wt.] | Amount of nucl. [mmol/kg PBT] | LT @ 1064 nm [% T] | IV (pellets) [mL/g] | $T_{PC}$ (pellets) [° C.] |
|---|---|---|---|---|---|
| Reference | 0 | 0 | 30 | 130 | 185 |
| B1 | 0.5 | 73.5 | 44 | 110 | 203 |
| B2 | 0.5 | 61 | 57 | 104 | 201 |
| B3 | 1 | 32.6 | 53 | 100 | 200 |
| B4 | 0.5 | 52.6 | 42 | 103 | 199 |
| B5 | 0.5 | 73.2 | 41 | 102 | 200 |

TABLE 2

| Component | Amount of nucl. [% by wt.] | Amount of nucl. [mmol/kg PBT] | LT @ 1064 nm [% T] | Modulus of elasticity [MPa] | Tensile strength [MPa] | Tensile strain at break [%] | IV (pellets) [ml/g] | $T_{PC}$ (pellets) [° C.] |
|---|---|---|---|---|---|---|---|---|
| Reference | 0 | 0 | 30 | 2500 | 56 | 170 | 130 | 185 |
| B3 | 0.2 | 6.5 | 24 | 2650 | 60 | 9.5 | 118 | 194 |
| B3 | 0.4 | 13.1 | 29 | 2650 | 60 | 9 | 115 | 195 |
| B3 | 0.6 | 19.6 | 39 | 2700 | 61 | 8.6 | 106 | 197 |
| B3 | 0.8 | 26.1 | 46 | 2750 | 61 | 5.4 | 102 | 198 |
| B3 | 1 | 32.6 | 53 | 2750 | 60 | 3.3 | 100 | 200 |
| B3 | 1.5 | 48.9 | 55 | 2750 | 55 | 2.5 | 81 | 201 |
| B3 | 2 | 65.3 | 62 | 2650 | 46 | 1.8 | 77 | 201 |
| B2 | 0.1 | 12 | 28 | 2600 | 60 | 11 | 117 | 188 |
| B2 | 0.2 | 24 | 45 | 2650 | 61 | 10 | 112 | 196 |
| B2 | 0.3 | 37 | 54 | 2700 | 61 | 9.5 | 107 | 199 |
| B2 | 0.4 | 49 | 55 | 2750 | 61 | 8 | 105 | 200 |
| B2 | 0.5 | 61 | 57 | 2750 | 61 | 7.5 | 104 | 201 |
| B2 | 0.75 | 91 | 58 | 2800 | 59 | 3.5 | 99 | 201 |
| B2 | 1.0 | 122 | 53 | 2800 | 56 | 2.5 | 93 | 202 |

The invention claimed is:

1. A process for producing laser-transparent moldings of any type which comprises preparing a thermoplastic molding composition comprising, as essential components:
    A) from 29 to 99.8% by weight of a polyester,
    B) from 0.2 to 2.0% by weight of alkali metal salts of aliphatic carboxylic acids or a mixture of these, based on 100% by weight of A) and B), wherein component B) is composed of sodium formate, sodium acetate, disodium adipate, the sodium salt of polyacrylic acid, or a mixture of these, and wherein the amount of component B) is from 15 to 200 mmol anion per kilogram of the polyester A), and also moreover
    C) from 0 to 70% by weight of further additives, where the total of the % by weight values for A) to C) does not exceed 100%, and
    extruding the thermoplastic molding composition, wherein the thermoplastic molding composition is laser-transparent.

2. The process according to claim 1, wherein the laser transparency of the molding is at least 33% (measured at 1064 nm on a molding of thickness 2 mm).

3. The process according to claim 1, wherein component B) has a degree of polymerization n of from 10 to 300.

4. The process according to claim 1, further comprising means of laser transmission welding for producing moldings.

5. A process for producing welded moldings which comprises using laser transmission welding to bond laser-transparent molding obtained according to the process of claim 4 to laser-absorbent moldings.

6. A process for producing welded molding which comprises using laser transmission welding to bond laser-transparent molding obtained according to the process of claim 1 to laser-absorbent moldings.

7. The process according to claim 1, wherein component B) is composed of sodium formate, disodium adipate, the sodium salt of polyacrylic acid, or a mixture of these.

8. The process according to claim 1, wherein component B) is composed of from 0.4 to 2.0% by weight of alkali metal salts of aliphatic carboxylic acids or a mixture of these, based on 100% by weight of A) and B).

9. The process according to claim 1, wherein component B) is composed of sodium formate.

10. The process according to claim 1, wherein component B) is composed of disodium adipate.

11. The process according to claim 1, wherein the polyester is a polypropylene terephthalate.

12. The process according to claim 1, wherein the polyester is a polybutylene terephthalate.

13. The process according to claim 1, wherein the polyester has a carboxy end group content of from 10 to 50 meq/kg.

14. The process according to claim 1, wherein component B) is composed of the sodium salt of polyacrylic acid.

15. The process according to claim 1, wherein the amount of component B) is from 15 to 122 mmol anion per kilogram of the polyester A).

16. The process according to claim 13, wherein the amount of component B) is from 15 to 122 mmol anion per kilogram of the polyester A).

17. A process for producing laser-transparent moldings of any type which comprises preparing a thermoplastic molding composition comprising, as essential components:
A) from 29 to 99.8% by weight of a polyester, wherein the polyester has a carboxy end group content of from 10 to 50 meg/kg,
B) from 0.2 to 2.0% by weight of alkali metal salts of aliphatic carboxylic acids or a mixture of these, based on 100% by weight of A) and B), wherein component B) is composed of sodium caprate, sodium laurate, sodium myristate, sodium palmitate, sodium stearate, sodium oleate, sodium linoleate, sodium linolenate, sodium cyclohexanecarboxylate, sodium alpha-methylbutyrate, sodium alpha,beta-dimethylvalerate, or a mixture thereof, and wherein the amount of component B) is from 15 to 200 mmol anion per kilogram of the polyester A), and
C) from 0 to 70% by weight of further additives, where the total of the % by weight values for A) to C) does not exceed 100%, and
extruding the thermoplastic molding composition, wherein the thermoplastic molding composition is laser-transparent.

18. The process according to claim 1, wherein the amount of component B) is from 15 to 122 mmol anion per kilogram of the polyester A) and the laser transparency at 1064 nm is at least 39%.

19. The process according to claim 18, wherein A) is PBT, B) is sodium acetate, and wherein the amount of A) is from 98.5 to 99.8% by weight, the amount of B) is from 0.2 to 1.5% by weight, and the amount of C) is from 0 to 1.3% by weight.

* * * * *